United States Patent [19]

Takeuchi

[11] Patent Number: 5,727,193
[45] Date of Patent: Mar. 10, 1998

[54] CLOCK SIGNAL AND LINE VOLTAGE CONTROL FOR EFFICIENT POWER CONSUMPTION

[75] Inventor: Kesatoshi Takeuchi, Suwa, Japan

[73] Assignee: Seiko Epson Corporation, Tokyo, Japan

[21] Appl. No.: 444,268

[22] Filed: May 18, 1995

[30] Foreign Application Priority Data

May 26, 1994 [JP] Japan .................................. 6-113040
Mar. 17, 1995 [JP] Japan .................................. 7-086508

[51] Int. Cl.$^6$ ............................................ G06F 1/08
[52] U.S. Cl. ........................................ 395/556; 395/750.01
[58] Field of Search ............................. 395/550, 750, 395/555, 556, 559, 560, 750.01, 750.03, 750.04, 750.05, 750.07; 364/270.2, 273.1

[56] References Cited

U.S. PATENT DOCUMENTS

| | | | |
|---|---|---|---|
| 4,405,898 | 9/1983 | Flemming | 328/72 |
| 4,700,124 | 10/1987 | Anderson | 323/225 |
| 4,766,567 | 8/1988 | Kato | 364/900 |
| 4,893,271 | 1/1990 | Davis et al. | 364/900 |
| 5,367,638 | 11/1994 | Niessen et al. | 395/250 |
| 5,469,561 | 11/1995 | Takeda | 395/550 |
| 5,526,253 | 6/1996 | Duley | 363/59 |
| 5,526,313 | 6/1996 | Etoh et al. | 365/205 |

FOREIGN PATENT DOCUMENTS

| | | | |
|---|---|---|---|
| 2-83720 | 9/1988 | Japan | G06F 1/26 |
| 2-105213 | 10/1988 | Japan | G06F 1/26 |
| 2083720 | 3/1990 | Japan | G06F 1/26 |
| 2105213 | 4/1990 | Japan | G06F 1/26 |

*Primary Examiner*—Dennis M. Butler
*Attorney, Agent, or Firm*—Oblon, Spivak, McClelland, Maier & Neustadt, P.C.

[57] ABSTRACT

A frequency of an operation clock signal CPCK output from a PLL circuit 3 is determined with division factors N and M stored in division factor memories 2 and 12. A voltage control signal LPS is input into a voltage-controlled oscillator in the PLL circuit 3 as well as to a line voltage control circuit 9. The line voltage control circuit 9 controls the level of a line voltage E supplied to other circuits including a CPU 1, in response to the voltage control signal LPS. Efficient power consumption and an appropriate operation speed are simultaneously attained because both of the frequency of the operation clock signal CPCK and the level of the line voltage E depend upon the voltage level of the voltage control signal LPS.

10 Claims, 10 Drawing Sheets

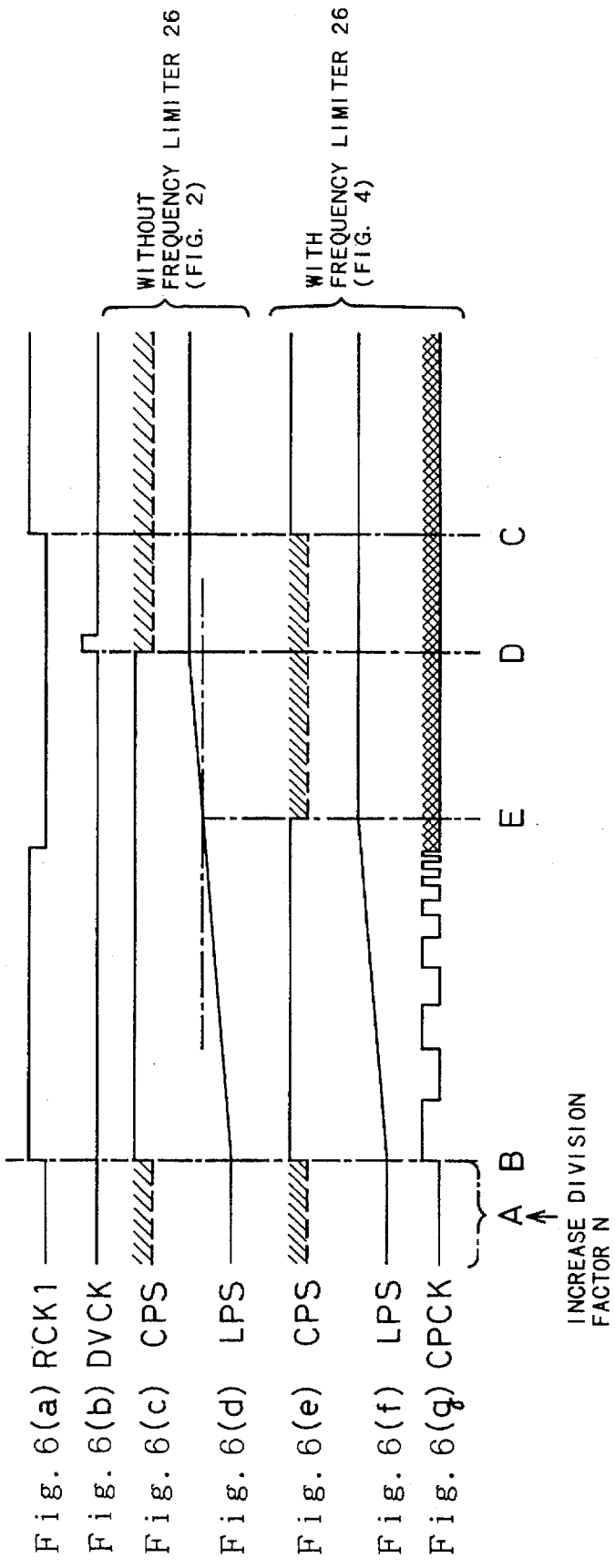

Fig. 7(A) WITHOUT FREQUENCY LIMITER 26
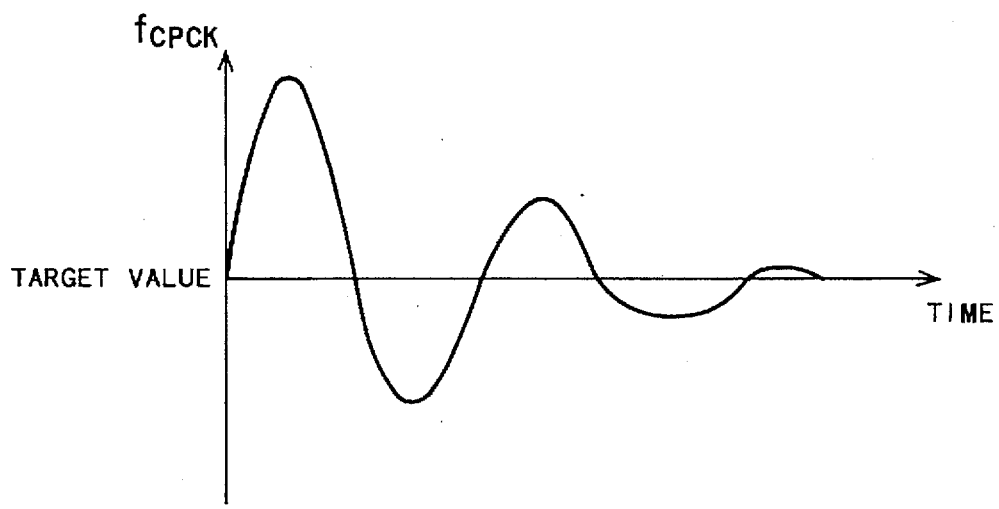
Fig. 7(B) WITH FREQUENCY LIMITER 26
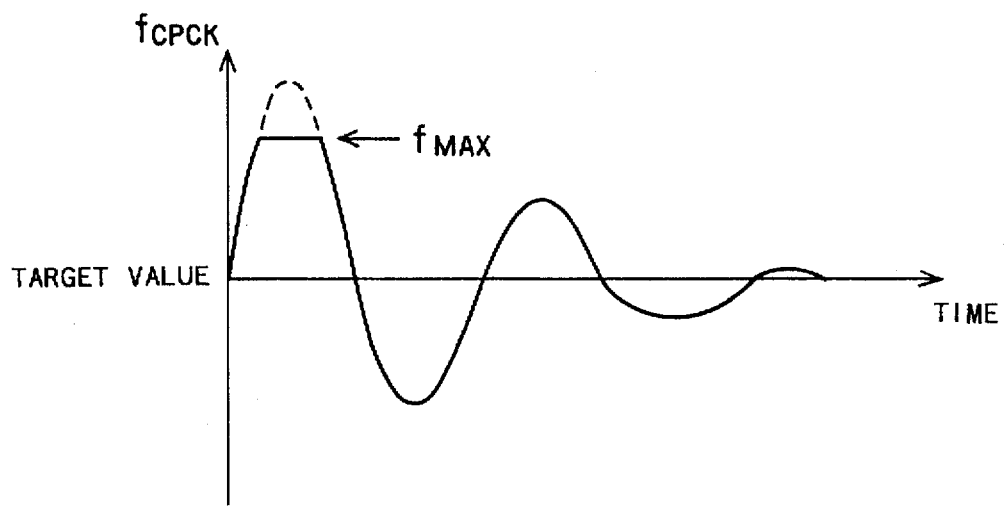

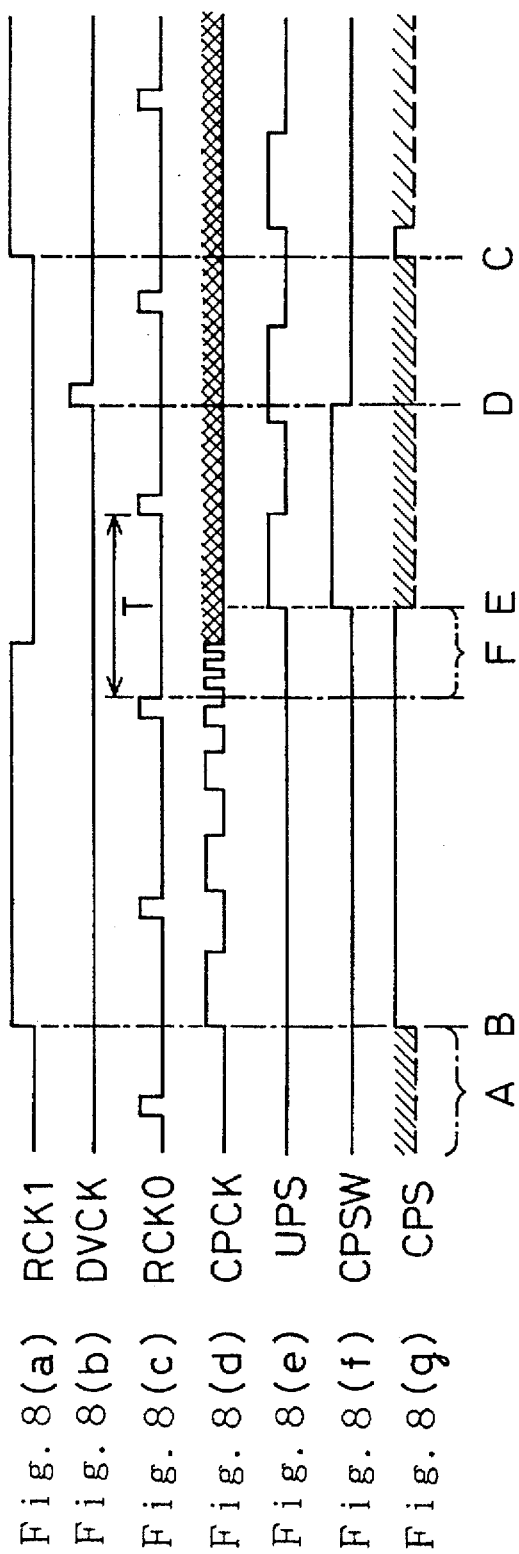

CLOCK SIGNAL AND LINE VOLTAGE CONTROL FOR EFFICIENT POWER CONSUMPTION

BACKGROUND OF THE INVENTION

1. Field of the Invention

The present invention relates to a data processing system of efficient power consumption.

2. Description of the Related Art

FIG. 10 is a block diagram illustrating a conventional data processing system. The data processing system includes a CPU (central processing unit) 100, a ROM (read only memory) 105, a RAM (random access memory) 106, a storage device 107, and an input/output unit 108. The conventional system is provided with a switch 104 to select one of two clock signals output from two clock generators 101 and 102 and supplies the selected clock signal to the CPU 100 to change the operation frequency of the CPU 100. When a manual switch 109 is switched by a user, a timing controller 103 receives a signal from the switch 109 and outputs a switching timing of the CPU clock accordingly. The switch 104 actually executes the switching operation according to the switching timing supplied from the timing controller 103. The switching of the CPU clock adjusts the operation speed of an application program under execution. For example, there is a case where a data processing system comprises a high-speed CPU while a game program executed by the data processing system was originally designed for a relatively low-speed CPU. This sometimes causes too quick operation of the game program, and the reduction of the clock frequency will adjust the operation speed to some extent.

Reduction of power consumption can be also attained by lowering a voltage of the system from 5 V to 3.3 V. However, the conventional data processing systems have some problems concerning the switching of clocks and the power reduction as follows:

(1) Reduction of a line voltage supplied to a CMOS transistor circuit will decrease the operation speed of the circuit. Therefore, the reduction of the line voltage, which is intended to lower the power consumption, undesirably affects the performance of the data processing system.

(2) If the CPU clock is switched to a lower frequency while input operation is not executed, a clock of maximum frequency is always supplied to the CPU during input operations. This means that power consumption can not be efficiently reduced during the input operations.

(3) The switching between two CPU clocks can not attain appropriate operation speeds for various application programs.

SUMMARY OF THE INVENTION

Accordingly, an object of the present invention is to provide an improved data processing system simultaneously attaining efficient power consumption and an appropriate operation speed.

The present invention is directed to a data processing system comprising: a microprocessor; clock signal generating means for generating an operation clock signal of a variable frequency, and supplying the operation clock signal to the microprocessor; and line voltage control means for controlling a line voltage which is related to the frequency of the operation clock signal, and supplying the line voltage to the microprocessor.

In this system, the frequency of the clock signal can be set to a desired value so as to simultaneously attain an appropriate operation speed and efficient power consumption.

In a preferred embodiment of the present invention, the clock signal generating means comprises: reference clock signal generating means for generating a reference clock signal; a first frequency divider for dividing the frequency of the operation clock signal by a first division factor to generate a divided clock signal; and a circuit for generating the operation clock signal while adjusting the frequency of the operation clock signal so that a phase of the divided clock signal conforms to a phase of the reference clock signal.

The frequency of the operation clock signal can be set to a desired value by adjusting the first division factor.

The above circuit comprises: a phase comparator for comparing the phase of the divided clock signal with the phase of the reference clock signal to generate a deviation signal representing a phase difference between the phases; a low pass filter for processing the deviation signal; and a voltage-controlled oscillator for generating the operation clock signal in response to an output signal of the low pass filter. The line voltage control means comprises a control circuit for controlling the line voltage as a function of a voltage level of an output signal of the low pass filter.

The line voltage supplied to the microprocessor is controlled according to the voltage level of the output signal from the low pass filter. This allows the line voltage of the microprocessor to be related to the frequency of the operation clock signal.

The clock signal generating means further comprises: a first memory, coupled to the microprocessor, for storing the first division factor.

The reference clock signal generating means comprises: original clock signal generating means for generating an original clock signal having a predetermined frequency; a second frequency divider for dividing the predetermined frequency of the original clock signal by a second division factor to generate the reference clock signal; and a second memory, coupled to the microprocessor, for storing the second division factor.

The microprocessor can change the first division factor and the second division factor so as to set the frequency of the clock signal to a desired value.

In another preferred embodiment of the present invention, the line voltage control means comprises a control circuit for controlling the line voltage as a function of the frequency of the operation clock signal.

The line voltage control means further comprises: upper limit control means for defining an upper limit of the line voltage; and lower limit control means for defining a lower limit of the line voltage; whereby the line voltage is defined in a range between the lower limit and the upper limit.

In still another preferred embodiment of the present invention, the clock signal generating means comprises: a frequency limiter for limiting a maximum frequency of the operation clock signal.

These and other objects, features, aspects, and advantages of the present invention will become more apparent from the following detailed description of the preferred embodiments with the accompanying drawings.

BRIEF DESCRIPTION OF THE DRAWINGS

FIGS. 6(a) through 6(g) are timing charts showing operations in the second embodiment;

Figure 9:
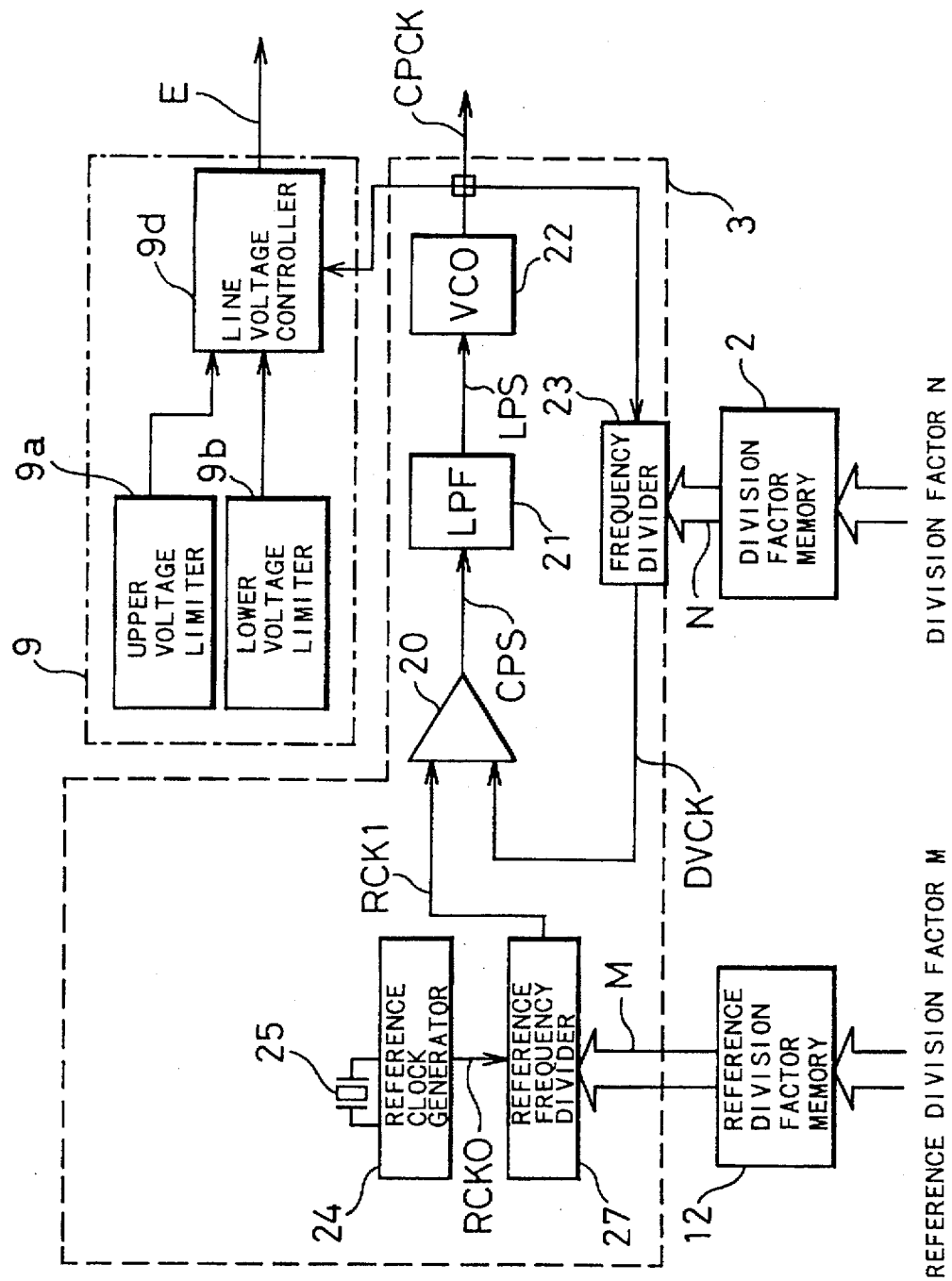
Figure 10:
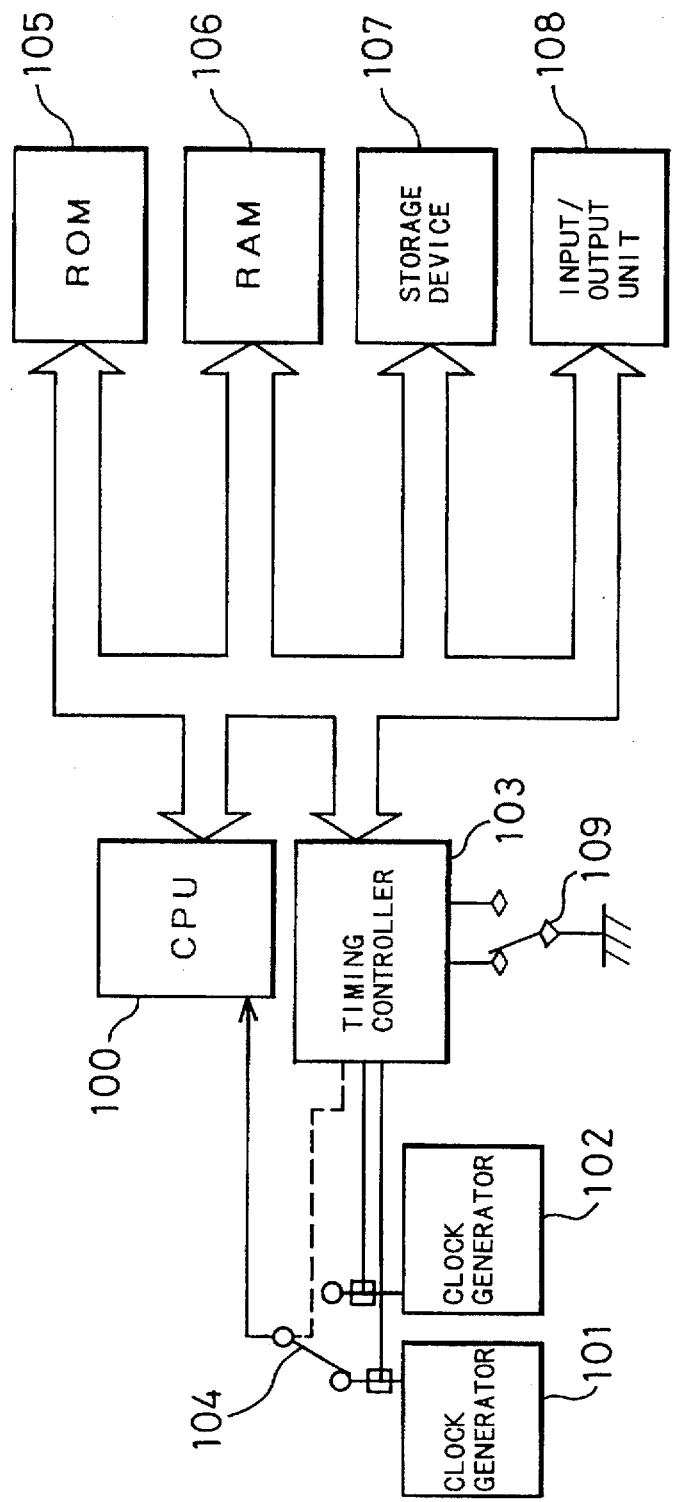

FIGS. (7A) and 7(B) show comparison of the convergence of the operation clock frequency $f_{CPCK}$ between the circuits without and with the frequency limiter 26;

FIGS. 8(a) through 8(g) are timing charts showing operations of the frequency limiter 26;

FIG. 9 is a block diagram showing a circuit structure having a line voltage control circuit 9d executing voltage control based on the operation clock frequency $f_{CPCK}$; and FIG. 10 is a block diagram illustrating a conventional data processing system.

DESCRIPTION OF THE PREFERRED EMBODIMENT

Figure 1:
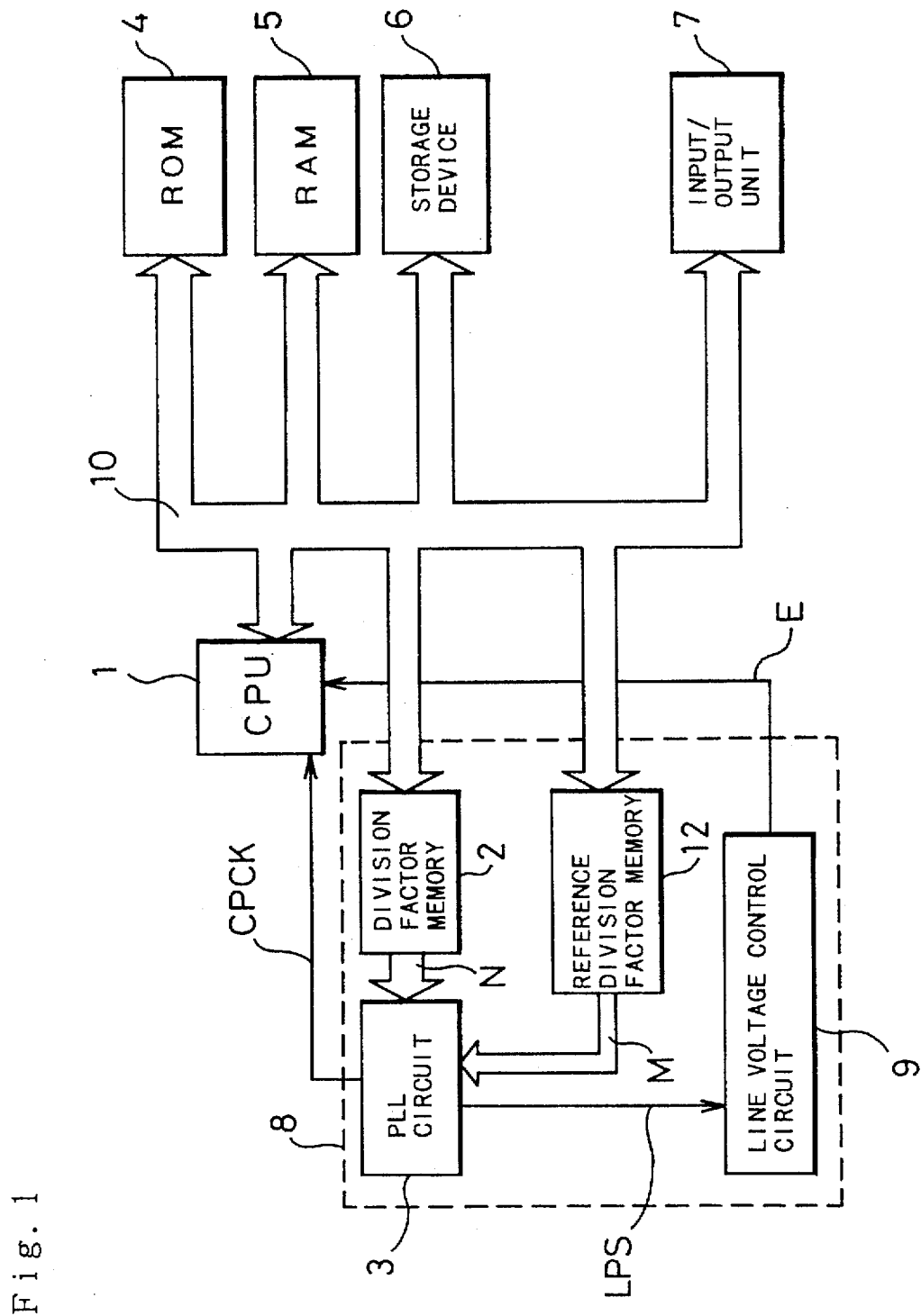
FIG. 1 is a block diagram illustrating a computer system as a first embodiment according to the invention.

FIG. 1 is a block diagram illustrating a computer system as a first embodiment according to the invention. The computer system comprises a CPU 1, a CPU bus 10, a ROM 4, a RAM 5, a storage device 6, an input/output unit 7, and a processing speed adjuster 8. The CPU bus 10 is coupled to the ROM 4, the RAM 5, the storage device 6, the input/output unit 7, and the processing speed adjuster 8. The processing speed adjuster 8 generates an operation clock signal CPCK which is supplied to the CPU 1. The CPU 1 operates in synchronism with the operation clock signal CPCK. The processing speed adjuster 8 also generates a line voltage E which is supplied to elements of the computer system including the CPU 1, the ROM 4, and the RAM 5. The CPU 1 controls operations of the whole system via the CPU bus 10. The input/output unit 7 includes input devices such as a keyboard, a mouse, a stylus pen, a touch panel, and a receiving circuit for a network system. The input/output unit 7 also includes output devices such as a CRT display, a liquid crystal display, and other flat panel displays. The processing speed adjuster 8 comprises a PLL (phase locked loop) circuit 3, a division factor memory 2, a reference division factor memory 12, and a line voltage controller 9.

Figure 2:
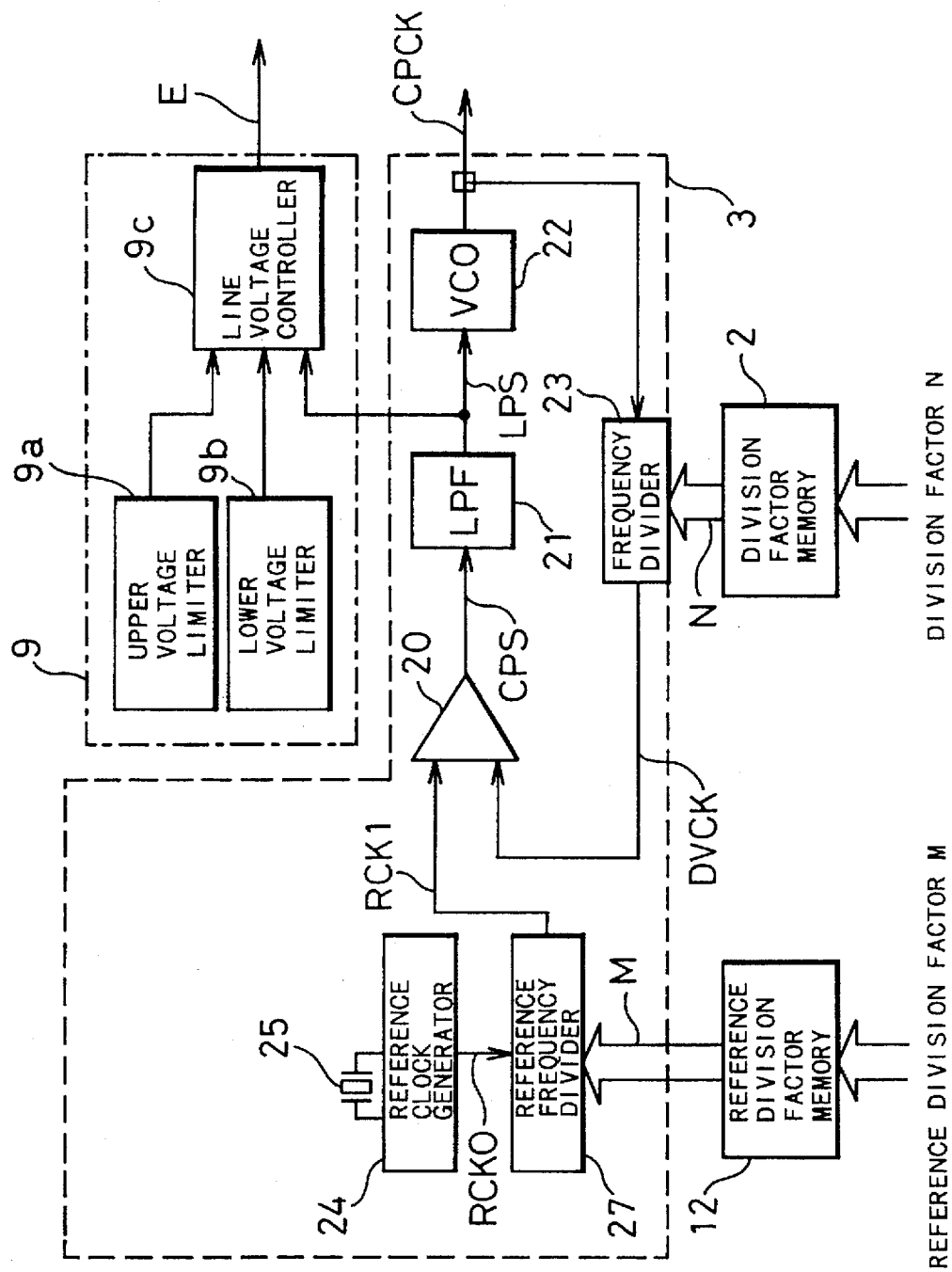
FIG. 2 is a block diagram illustrating an internal circuit structure of an processing speed adjuster 8.

FIG. 2 is a block diagram illustrating an internal circuit structure of the processing speed adjuster 8. The PLL circuit 3 includes a phase comparator 20, a loop filter (LPF) 21, a voltage controlled oscillator (VCO) 22, a frequency divider 23, a reference clock generator 24, an oscillator 25, and a reference frequency divider 27. A PLL circuit in a narrow sense consists of the phase comparator 20, the loop filter 21, and the voltage-controlled oscillator 22. The line voltage control circuit 9 further comprises an upper voltage limiter 9a, a lower voltage limiter 9b, and a line voltage control circuit 9c.

The reference division factor memory 12 and the division factor memory 2 are respectively coupled to the CPU 1 via the CPU bus 10 and store a reference division factor M and a division factor N supplied from the CPU 1. The reference clock generator 24 having the oscillator 25 such as a quartz oscillator generates an original clock signal RCK0. The reference frequency divider 27 divides the frequency of the original clock signal RCK0 by the reference division factor M stored in the reference division factor memory 12 to generate a reference clock signal RCK1.

The division factor N and the reference division factor M correspond to the first division factor and the second division factor of the claimed invention, respectively.

The reference clock signal RCK1 is supplied from the reference frequency divider 27 to the phase comparator 20 as a reference signal while a divided clock signal DVCK is supplied from the frequency divider 23 to the phase comparator 20 as a subject signal to be compared. The phase comparator 20 compares the divided clock signal DVCK with the reference clock signal RCK1 to generate a deviation signal CPS representing a phase difference between these two signals RCK1 and DVCK. The deviation signal CPS is transmitted to the loop filter 21 having a charge pump circuit therein. The charge pump circuit in the loop filter 21 generates a voltage control signal LPS. The level of the voltage control signal LPS depends on a level of the deviation signal CPS as well as a number of pulses of the same given to the loop filter 21.

The voltage control signal LPS output from the loop filter 21 is transmitted to the voltage-controlled oscillator 22 and the line voltage controller 9. The voltage-controlled oscillator 22 generates an operation clock signal CPCK whose frequency depends on the voltage level of the voltage control signal LPS. The frequency divider 23 divides the frequency of the operation clock signal CPCK by the division factor N stored in the division factor memory 2 to generate the divided clock signal DVCK. The divided clock signal DVCK is supplied from the frequency divider 23 to the phase comparator 20 to be compared with the reference clock signal RCK1 as described previously. The frequency of the operation clock signal CPCK converges to allow the phase difference between the two signals RCK1 and DVCK to approach zero. The frequency of the operation clock signal CPCK after the convergence is equal to a product of a frequency $f_{RCK1}$ of the reference clock signal RCK1 and the division factor N, that is, $N \times f_{RCK1}$.

The following relations hold between a frequency $f_{RCK0}$ of the original clock signal RCK0, the frequency $f_{RCK1}$ of the reference clock signal RCK1, and a frequency $f_{CPCK}$ of the operation clock signal CPCK:

$$f_{RCK1} = f_{RCCK0}/M \tag{1}$$

$$f_{CPCK} = N \times f_{RCK1} = N \times f_{RCK0}/M \tag{2}$$

When $f_{RCK0}$=10 KHz and M=4, and N=, for example, $f_{RCK1}$=2.5 KHz and $f_{CPCK}$=5 KHz. 2.5 KHz and $f_{CPCK}$32 5 KHz.

The CPU 1 can adjust the frequency $f_{CPCK}$ of the operation clock signal CPCK to any desirable value by simply rewriting the division factor N stored in the division factor memory 2 and the reference division factor M stored in the reference division factor memory 12. This advantage is ascribed to the division factor memory 2 and reference division factor memory 12.

The line voltage control circuit 9 includes the upper voltage limiter 9a and the lower voltage limiter 9b for defining an upper limit and a lower limit of the line voltage E, respectively, as well as the line voltage control circuit 9c for controlling the level of the line voltage E. The voltage control signal LPS is supplied from the loop filter 21 to the line voltage controller 9. The line voltage control circuit 9 controls the line voltage E, which is supplied to various circuits in the computer system. The loop filter 21 and the voltage-controlled oscillator 22 are supplied a fixed voltage, which is different from the line voltage E, from another power source (not shown).

The line voltage control circuit 9 controls the level of its output voltage E in response to the level of the voltage control signal LPS. As described previously, the frequency $f_{CPCK}$ of the operation clock signal CPCK supplied to the CPU 1 is also controlled in response to the voltage level of the voltage control signal LPS. This means that the frequency of the operation clock signal CPCK is related to the line voltage E of the system. The computer system accordingly operates at an appropriate speed according to the frequency of the operation clock signal CPCK while its power consumption is reduced according to the frequency of the operation clock signal CPCK.

Figure 3:
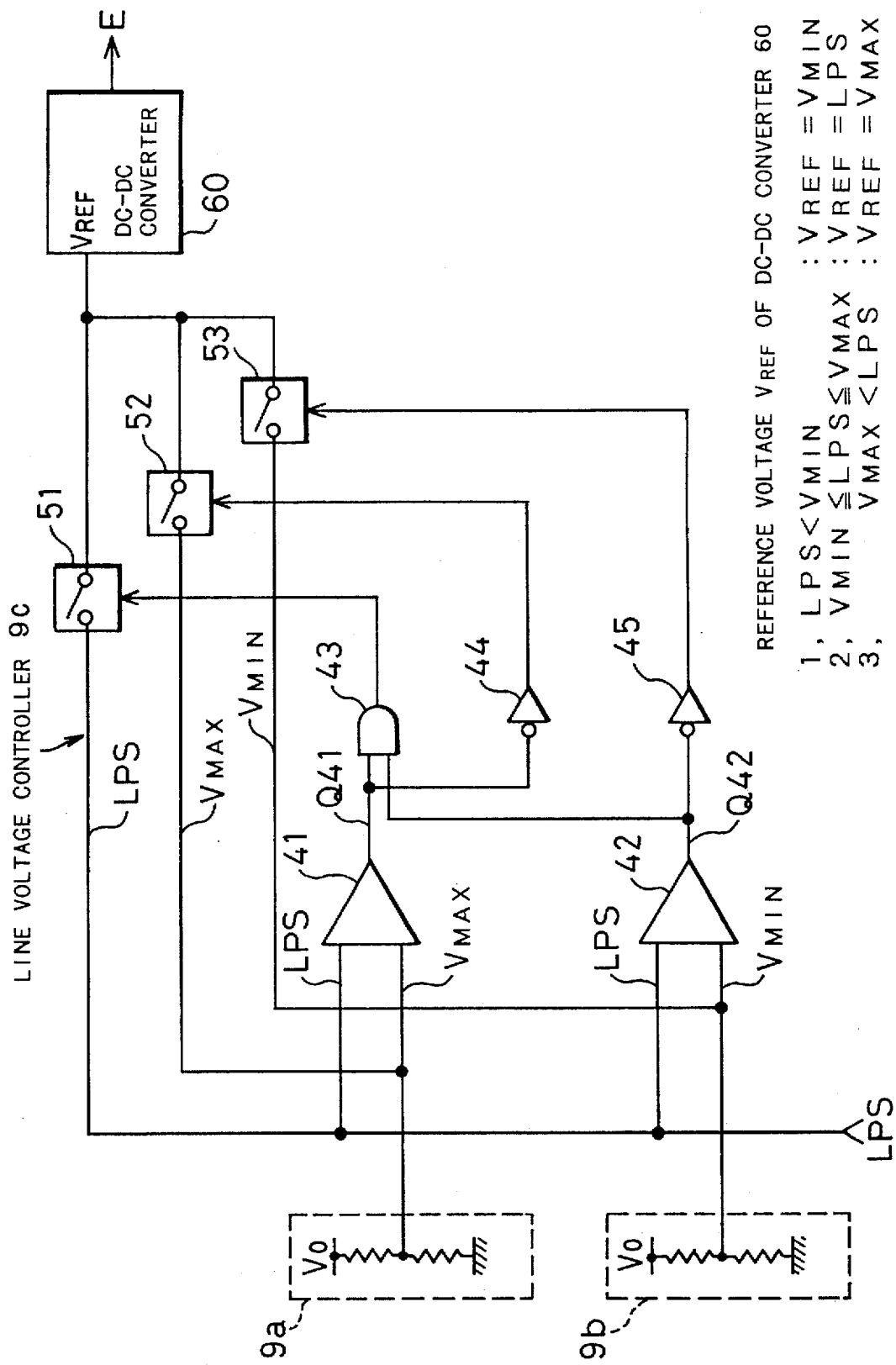
FIG. 3 is a block diagram illustrating an internal structure of an line voltage controller 9.

FIG. 3 is a block diagram illustrating an internal structure of the line voltage controller 9. The upper voltage limiter 9a and the lower voltage limiter 9b divides a fixed voltage $V_O$ from a grounding potential by two resistors to generate a maximum voltage $V_{MAX}$ and a minimum voltage $V_{MIN}$, respectively. The line voltage control circuit 9c comprises two comparators 41 and 42, an AND gate 43, two inverters (NOT gates) 44 and 45, three switches 51 through 53, and a DC-DC converter 60.

The first comparator 41 compares the maximum voltage $V_{MAX}$ supplied from the upper voltage limiter 9a with the level of the voltage control signal LPS output from the loop filter 21. The first comparator 41 accordingly generates an output signal Q41 at H (high) level if LPS≦$V_{MAX}$, and at L (low) level if $V_{MAX}$<LPS. The second comparator 42 compares the minimum voltage $V_{MIN}$ supplied from the lower voltage limiter 9b with the voltage level of the voltage control signal LPS. The second comparator 42 accordingly generates an output signal Q42 at H level if $V_{MIN}$≦LPS, and at L level if LPS<$V_{MIN}$. The output signal Q41 of the first comparator 41 is supplied to the AND gate 43 and the first inverter 44 while the output signal Q42 of the second comparator 42 is given to the AND gate 43 and the second inverter 45. The AND gate 43 outputs a switching signal for turning on and off the first switch 51, whereas the first inverter 44 and the second inverter 45 respectively output switching signals for turning on and off the second switch 52 and the third switch 53, respectively. The first through third switches 51-53 respectively receive the voltage control signal LPS, the maximum voltage $v_{MAX}$, and the minimum voltage $V_{MIN}$ at their input terminals. One of the three switches 51 through 53 then supplies its output as a reference voltage $V_{REF}$ to the DC-DC converter 60. Based on the results of comparison in the first and second comparators 41 and 42, one of the voltage control signal LPS, the maximum voltage $V_{MAX}$, and the minimum voltage $V_{MIN}$ is given as the reference voltage $V_{REF}$ to the DC-DC converter 60.

As shown in FIG. 3, the reference voltage $V_{REF}$ given to the DC-DC converter 60 is determined according to the voltage level of the voltage control signal LPS as follows:

When $LPS<V_{MIN}:V_{REF}=V_{MIN}$

When $V_{MIN}≦LPS≦V_{MAX}:V_{REF}=LPS$

When $V_{MAX}<LPS:V_{REF}=V_{MAX}$

In the circuit shown in FIG. 3, the reference voltage $V_{REF}$ given to the DC-DC converter 60 is proportional to the voltage level of the voltage control signal LPS within a voltage range defined by the maximum voltage $V_{MAX}$ and the minimum voltage $V_{MIN}$. The line voltage E output from the DC-DC converter 60 to other circuits of the computer system is accordingly proportional to the voltage level of the voltage control signal LPS within the predetermined voltage range.

The power consumption by the CPU 1 is given by:

$$W=\Sigma E^2 \times P \times f \times C \qquad (3)$$

where 'W' denote a power consumption [Watt], 'E' a line voltage [Volt], 'P' a signal operation factor [instructions/ clock], '$f_{CPCK}$' a frequency [Hz] of the operation clock signal CPCK, and 'C' a capacitance element [F] of the computer system.

The signal operation factor P indicates how many instructions the CPU 1 executes per clock cycle. Some microprocessors currently available execute a plurality of instructions in one clock cycle. The power consumption of such microprocessors increases in proportion to the number of instructions executed in one clock cycle, and therefore the signal operation factor P introduces this effect to the calculation of power consumption. The signal operation factor P depends upon the type of microprocessor used as the CPU 1. The capacitance element C is also a fixed value depending on the structure of the computer system. Variables in Equation (3) are accordingly the line voltage E and the operation clock frequency $f_{CPCK}$. Therefore, a reduced power consumption and an appropriate operation speed can be simultaneously attained by adjusting the operation clock frequency $f_{CPCK}$ and the line voltage E. The frequency $f_{CPCK}$ of the operation clock signal CPCK is set arbitrarily to obtain an appropriate operation speed of an application program, and the line voltage E is controlled in connection with the operation clock frequency $f_{CPCK}$.

Suppose that the frequency $f_{RCK0}$ of the original clock signal RCK0 (FIG. 2) is equal to 10 KHz and the reference division factor M is equal to 4. If the division factor N is set to 2, $f_{RCK1}$ and $f_{CPCK}$ become 2.5 KHz and 5 KHz, respectively. If the division factor N is set to 2 during non-operation state of an input device under execution of a word processor program, Equation (2) gives the operation clock frequency $f_{CPCK}$ equal to 5 KHz. When the division factor N is set to 2 during operation state of the input device, on the other hand, the operation clock frequency $f_{CPCK}$ becomes 100 KHz. In a similar manner, the operation clock frequency $f_{CPCK}$ can be set to 5 MHz during screen scrolling and to 30 MHz during calculations. Determination of the division factor N according to various operation modes of the computer system simultaneously attains an operation speed suitable for each operation mode and a reduced power consumption. Further, the setting of the division factor N according to various application programs gives an operation speed suitable for each application program.

An application program may set a desired operation speed FT of the program, and a capability factor CT representing a relative processing speed of the CPU 1. The following Equation (4) determines the operation clock frequency $f_{CPCK}$ from these parameters FT and CT.

$$f_{CPCK}=f_{RCK1} \times FT \times CT \qquad (4)$$

The capability factor CT is a ratio of a processing speed $S_{REF}$ of a reference microprocessor to another processing speed $S_{CMP}$ of a microprocessor actually installed in the computer system, that is, CT=$S_{REF}/S_{CMP}$. Suppose that the processing speed $S_{REF}$ of an i486 processor (trade mark of Intel Corporation) is 1.0 and the processing speed $S_{CMP}$ of a Pentium processor (trade mark of Intel Corporation) is 4.0, the capability factor CT is equal to 1 for the i486 processor and 0.25 for the Pentium processor. Equation (4) shows that the microprocessor having the smaller capability factor CT, that is, the microprocessor having the greater processing speed requires the smaller operation clock frequency $f_{CPCK}$ for the same operation speed FT.

The capability factor CT and the operation speed FT can be specified in each application program as its operation conditions. The capability factor CT depends upon the type of microprocessor used as the CPU 1 and is generally set only once when the user executes each application program for the first time or when the application program is installed into the system. The user may select one of various types of microprocessors, which are displayed as alternatives on the screen. The user can also change the operation speed FT by preference.

According to Equations (2) and (4), the division factor N stored in the division factor memory 2 can be expressed as follows:

$$N = FT \times CT \qquad (5)$$

The CPU 1 writes the division factor N thus determined into the division factor memory 2 to attain the desired operation speed FT specified by the user.

Now think of a case where a game program including thinking process by the program is executed by the CPU 1 whose capability factor CT is one, and the reference clock frequency $f_{RCK1}$ is set equal to 2.5 KHz. When the operation speed FT is set equal to 40, that is, when the division factor N is set equal to 40, under the stand-by condition for input operation, the operation clock frequency $f_{CPCK}$ becomes 100 KHz, and thereby the power consumption is efficiently reduced. When the operation speed FT is set equal to 12,000, that is, when the division factor N is set equal to 12,000, under the thinking process by the program, on the other hand, the operation clock frequency $f_{CPCK}$ becomes 30 MHz to allow the high-speed processing.

In another case where the capability factor CT of the microprocessor has 0.25, the division factor N becomes 10 if the operation speed FT is set equal to 40, and the operation clock frequency $f_{CPCK}$ becomes 25 MHz accordingly. If the operation speed FT is set equal to 12,000, the division factor N becomes 3,000 and the operation clock frequency $f_{CPCK}$ becomes 7.5 MHz. The structure of the embodiment attains an appropriate operation speed according to the throughput of the microprocessor and to the processing by the application program. The operation clock can be varied in a range of several hundreds Hz to several tens MHz to execute a high-level game whose operation speed FT is varied in the middle of the game accordingly.

In the multi-operating system environment where one computer system is managed by a plurality of operating systems, the respective operating systems may have different preferable operation speeds. When a plurality of application programs are executed on each of the plural operating systems, preferable operation speeds FT for the respective application programs are generally different from one another. The present invention simultaneously attains the preferable operation speeds FT for the respective application programs and efficient reduction of power consumption even in those cases.

Figure 4:
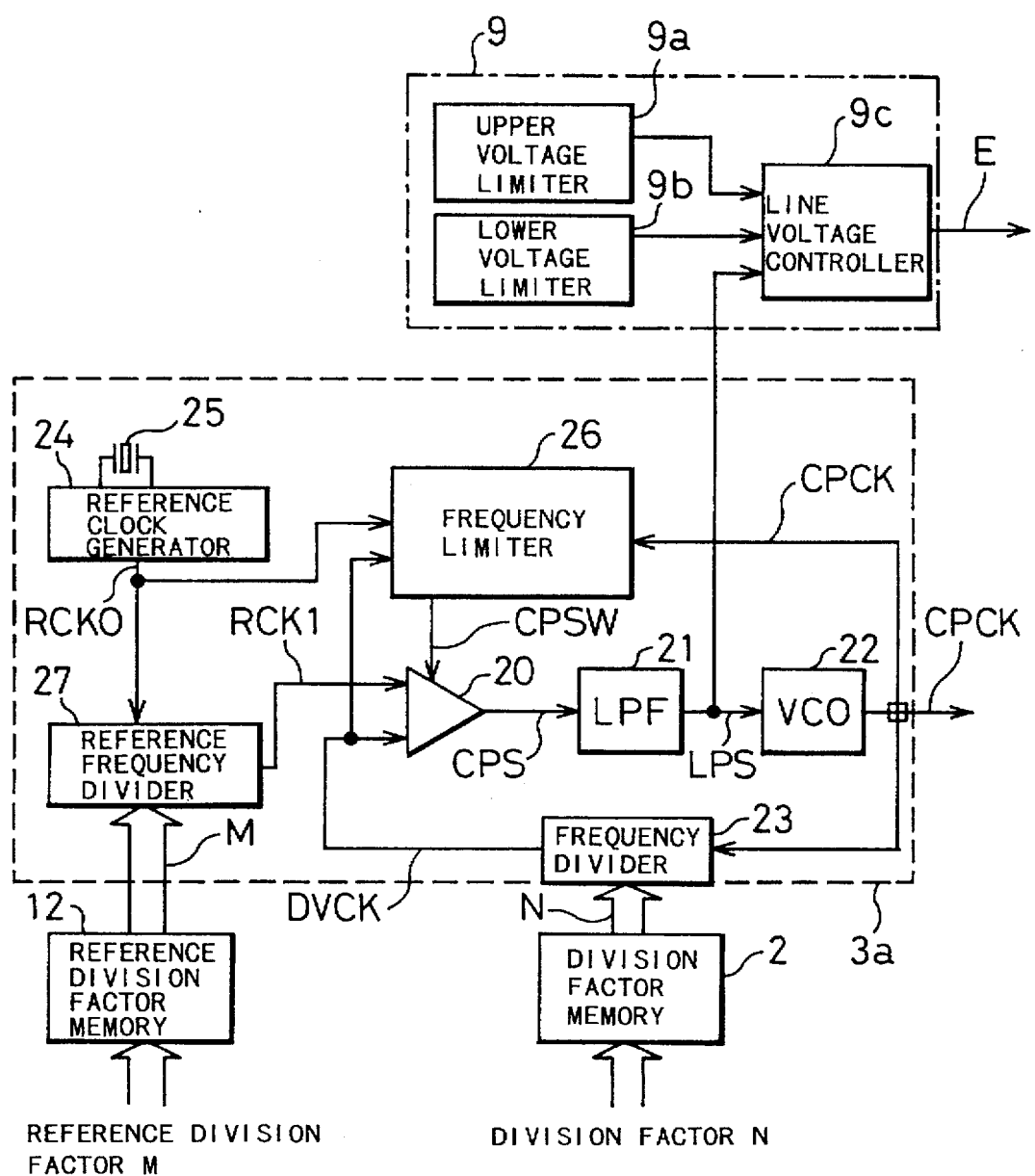
FIG. 4 is a block diagram illustrating an internal circuit structure of the processing speed adjuster 8 in a second embodiment according to the invention.

FIG. 4 is a block diagram illustrating an internal circuit structure of the processing speed adjuster 8 in a second embodiment according to the invention. The circuit shown in FIG. 4 comprises a frequency limiter 26 in addition to the elements shown in FIG. 2. The frequency limiter 26 receives the original clock signal RCK0 output from the reference clock generator 24, the divided clock signal DVCK output from the frequency divider 23, and the operation clock signal CPCK output from the voltage-controlled oscillator 22. The frequency limiter 26 generates a frequency control signal CPSW in response to these input signals and supplies the frequency control signal CPSW to the phase comparator 20. As described later, when the operation clock signal CPCK reaches a predetermined maximum frequency, the frequency limiter 26 changes the level of the frequency control signal CPSW to set the output CPS of the phase comparator 20 into a high impedance state. This results in regulating the maximum frequency of the operation clock signal CPCK.

Figure 5:
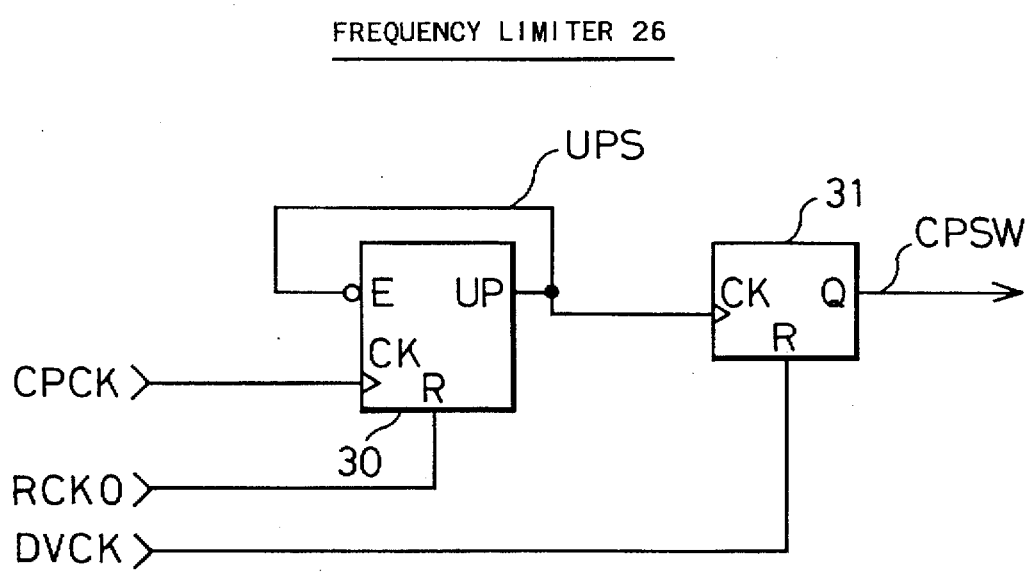
FIG. 5 is a block diagram showing an internal structure of a frequency limiter 26.

FIG. 5 is a block diagram showing an internal structure of the frequency limiter 26. The frequency limiter 26 comprises a counter circuit 30 and a flip-flop circuit (FF) 31. An internal counter of the counter circuit 30 is reset to zero when the original clock signal RCK0 rises to H level. When the original clock signal RCK0 falls to L level, on the contrary, the counter circuit 30 starts counting up the number of pulses of the operation clock signal CPCK. When the count of the counter circuit 30 reaches a predetermined value corresponding to an allowable maximum of the operation clock frequency $f_{CPCK}$, the counter circuit 30 sets an up-signal UPS from L level to H level. The up-signal UPS is input into an enable terminal of the counter circuit 30 and a clock input terminal of the flip-flop 31. Upon a rise of the up-signal UPS to H level, the counter circuit 30 stops the counting-up, and the flip-flop 31 rises the frequency control signal CPSW from L level to H level. The deviation signal CPS supplied from the phase comparator 20 (FIG. 4) is forcibly set in high impedance state in response to a rise of the frequency control signal CPSW to H level. The flip-flop 31 is reset in response to a pulse of the divided clock signal DVCK supplied from the frequency divider 23, and thereby the frequency control signal CPSW falls to L level. This results in canceling the restriction of the deviation signal CPS.

FIGS. 6(a) through 6(g) are timing charts showing the operation of the frequency limiter 26. FIGS. 6(c) and 6(d) show operations of the circuit without the frequency limiter 26 (the circuit shown in FIG. 2), whereas FIGS. 6(e) through 6(g) show operations of the circuit with the frequency limiter 26 (the circuit shown in FIG. 4). Operations shown in FIGS. 6(a) and 6(b) are common to both the circuits.

During a period A shown in FIG. 6(g), the CPU 1 rewrites the division factor N stored in the division factor memory 2 to a greater value in order to increase the operation clock frequency $f_{CPCK}$. At a time point B, the frequency divider 23 was expected to generate a pulse of the divided clock signal DVCK (FIG. 6(b)) based on the original value of the division factor N before rewriting. No pulse of the divided clock signal DVCK is generated at the time point B because the division factor N has been rewritten to a greater value during the period A, and the phase comparator 20 changes the deviation signal CPS (FIG. 6(c)) from a high impedance state to H level accordingly. The hatched portions in FIG. 6(c) represent a high impedance state. The potential of the voltage control signal LPS (FIG. 6(d)) output from the loop filter 21 gradually increases after the deviation signal CPS rises to H level at the time pint B. The increased potential causes a gradual increase in the frequency $f_{CPCK}$ of the operation clock signal CPCK (FIG. 6(g)), which is generated by the voltage-controlled oscillator 22. The hatched portion of FIG. 6(g) represents a high frequency area where waveforms can not be illustrated precisely.

In the circuit without the frequency limiter 26 (FIG. 2), as shown in FIGS. 6(b) through 6(d), the potential of the voltage control signal LPS continues increasing until a next pulse of the divided clock signal DVCK is generated at a time point D. This results in a continuous increase in the frequency $f_{CPCK}$ of the operation clock signal CPCK.

By way of example, it is assumed that the frequency $f_{CPCK}$ of the operation clock signal CPCK will exceed the working range of the CPU 1 at a time point E. Under such conditions, the circuit with the frequency limiter 26 (FIG. 4) works to control the increase in the frequency $f_{CPCK}$ of the operation clock signal CPCK at the time point E. As shown in FIGS. 6(e) and 6(f), the circuit sets the deviation signal CPS in a high impedance state at the time point E to stop the increase in potential of the voltage control signal LPS. The PLL circuit (elements 20 through 23 in FIG. 4) works to make the phase of the divided clock signal DVCK converge at that of the reference clock signal RCK1. As a result, the frequency $f_{CPCK}$ of the operation clock signal CPCK converges at a predetermined value, which is specified by the division factor N in the division factor memory 2. FIGS. 7(A) and 7(B) show comparison of the convergency of the operation clock frequency $f_{CPCK}$ between the circuits without and with the frequency limiter 26. In the circuit without the frequency limiter 26, there is no upper limit of the operation clock frequency $f_{CPCK}$ as shown in FIG. 7(A). In the circuit with the frequency limiter 26, on the other hand, the clock frequency $f_{CPCK}$ gradually converges on a target value within a range defined by an upper limit $f_{MAX}$ as shown in FIG. 7(B). Although the clock frequency $f_{CPCK}$ converges at the same target value in either case, the frequency limiter 26 works to limit the clock frequency $f_{CPCK}$ within the normal working range of the CPU 1. The frequency limiter 26 also works to accelerate the convergency on the target value.

FIGS. 8(a) through 8(g) are timing charts showing operations of the circuit shown in FIGS. 4 and 5 in detail. The circuit diagram of FIG. 5 shows that the counter circuit 30 counts up the pulses of the operation clock signal CPCK during a time period when the original clock signal RCK0 (FIG. 8(c)) is in L level, and is reset in response to a rise of the original clock signal RCK0. In the example of FIG. 8(d), the frequency $f_{CPCK}$ of the operation clock signal CPCK significantly increases during a period F immediately before a time point E. The counter circuit 30 accordingly completes the counting-up of a predetermined number at the time point E, and changes the up-signal UPS (FIG. 8(e)) from L level to H level. In response to the rise of the up-signal UPS, the counter circuit 30 stops the counting, and the frequency control signal CPSW (FIG. 8(f)) output from the flip-flop 31 rises to H level. The phase comparator 20 then forcibly sets the deviation signal CPS in a high impedance state in response to the rise of the frequency control signal CPSW. When a pulse of the divided clock signal DVCK (FIG. 8(b)) is supplied at a time point D, the flip-flop 31 is reset to return the frequency control signal CPSW from H level to L level. Since the phase comparator 20 sets the deviation signal CPS in a high impedance state in response to the pulse of the divided clock signal DVCK, the deviation signal CPS is kept in a high impedance state even after the time point D. After a time point C, similar operations to those during the period between the time point B and the time point E are repeated to make the frequency $f_{CPCK}$ of the operation clock signal CPCK converge so that the phase of the reference clock signal RCK1 becomes equal to that of the divided clock signal DVCK.

As can be understood from the above explanation, the frequency $f_{CPCK}$ of the operation clock signal CPCK is monitored during a monitor period T when the original clock signal RCK0 is kept in L level (FIG. 8(c)). In other words, the frequency limiter 26 counts the number of pulses of the operation clock signal CPCK during the monitor period T. When the count reaches a predetermined value corresponding to the maximum frequency, the frequency limiter 26 transmits the frequency control signal CPSW to the phase comparator 20 to set the deviation signal CPS in a high impedance state. This effectively controls the maximum frequency of the operation clock signal CPCK given to the CPU 1. The CPU 1 accordingly has stable operations even if the operation clock frequency $f_{CPCK}$ is changing.

Another circuit with a Miller's integrator shown in FIGS. 1 through 3 of JAPANESE PATENT LAID-OPEN GAZETTE No. H-2-256311 is applicable to the voltage-controlled oscillator 22. This circuit easily realizes a voltage-controlled oscillator which has a wide oscillation frequency range of several hundreds Hz to hundred and several tens MHz.

When a duty ratio of the operation clock signal CPCK is not equal to 1:1, it is adjustable to 1:1 by providing a flip-flop circuit to half the frequency of the operation clock signal CPCK.

The line voltage E controlled by the line voltage control circuit 9 may be supplied to the loop filter 21 and the voltage-controlled oscillator 22.

The DC-DC converter 60 can be replaced by another power regulation circuit such a switching regulator for adjusting its output voltage E according to the voltage level of the voltage control signal LPS. Since the operation clock frequency $f_{CPCK}$ depends upon the voltage level of the voltage control signal LPS, the output voltage E of the alternative power regulation circuit is also related to the operation clock frequency $f_{CPCK}$.

The line voltage control circuit 9 can be replaced by a power regulation circuit which executes the voltage control based on the operation clock frequency $f_{CPCK}$. FIG. 9 is a block diagram showing a circuit structure having a line voltage controller 9d executing voltage control based on the operation clock frequency $f_{CPCK}$. In the circuit of FIG. 9, the line voltage controller 9d receives the operation clock signal CPCK, instead of the voltage control signal LPS in the circuit of FIG. 2.

In general, the line voltage control circuit 9 can be any power circuit for generating the line voltage E which is related to the frequency $f_{CPCK}$ of the operation clock signal CPCK.

In the above embodiments, the output voltage E generated by the line voltage control circuit 9 is supplied to the other circuits in the computer system. Alternatively, the output voltage E of the line voltage control circuit 9 may be supplied only to those circuits which have relatively large power consumption, such as the CPU 1, the RAM 5, a graphic controller (not shown), while a constant voltage is supplied to the other circuits. Further, each circuit having relatively large power consumption may comprise a line voltage control circuit 9 of its own, which controls the line voltage in a specific voltage range suitable for each circuit.

The present invention is applicable to other systems having various microprocessors such as a DSP (digital signal processor), a video processor, a 3-D processor, a recognition processor, and a decision processor as the CPU 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system comprising:
   a microprocessor;
   clock signal generating means for generating an operation clock signal of a variable frequency, and supplying said operation clock signal to said microprocessor; and
   line voltage control means for controlling a variable line voltage as a function of the variable frequency of said operation clock signal irrespective of a temperature of said microprocessor, and supplying said variable line voltage to said microprocessor.

2. A data processing system in accordance with claim 1, wherein said clock signal generating means comprises:

reference clock signal generating means for generating a reference clock signal;

a first frequency divider for dividing the frequency of said operation clock signal by a first division factor to generate a divided clock signal; and a circuit for generating said operation clock signal while adjusting the variable frequency of said operation clock signal so that a phase of said divided clock signal conforms to a phase of said reference clock signal.

3. A data processing system in accordance with claim 2, wherein said circuit comprises:

a phase comparator for comparing the phase of said divided clock signal with the phase of said reference clock signal to generate a deviation signal representing a phase difference between the phases;

a low pass filter for processing said deviation signal; and a voltage-controlled oscillator for generating said operation clock signal in response to an output signal of said low pass filter; and wherein said line voltage control means comprises a control circuit for controlling said variable line voltage as a function of a voltage level of the output signal of said low pass filter.

4. A data processing system in accordance with claim 3, wherein said clock signal generating means further comprises:

a first memory, coupled to said microprocessor, for storing said first division factor.

5. A data processing system in accordance with claim 4, wherein said reference clock signal generating means comprises:

original clock signal generating means for generating an original clock signal having a predetermined frequency;

a second frequency divider for dividing the predetermined frequency of said original clock signal by a second division factor to generate said reference clock signal; and a second memory, coupled to said microprocessor, for storing said second division factor.

6. A data processing system in accordance with claim 2, wherein said clock signal generating means further comprises:

a first memory, coupled to said microprocessor, for storing said first division factor.

7. A data processing system in accordance with claim 6, wherein said reference clock signal generating means comprises:

original clock signal generating means for generating an original clock signal having a predetermined frequency;

a second frequency divider for dividing the predetermined frequency of said original clock signal by a second division factor to generate said reference clock signal; and a second memory, coupled to said microprocessor, for storing said second division factor.

8. A data processing system in accordance with claim 3, wherein said operation clock signal generated by said voltage-controlled oscillator has a frequency which is a function of said output signal of said low pass filter.

9. A data processing system in accordance with claim 1, wherein said line voltage control means further comprises:

upper limit control means for defining an upper limit of said line voltage; and lower limit control means for defining a lower limit of said line voltage;

whereby said line voltage is defined in a range between said lower limit and said upper limit irrespective of said temperature of said microprocessor.

10. A data processing system in accordance with claim 1, wherein said clock signal generating means comprises:

a frequency limiter for limiting a maximum frequency of said operation clock signal.

* * * * *